(No Model.) 2 Sheets—Sheet 1.
J. SWANBURG.
FRUIT PICKER.
No. 501,032. Patented July 4, 1893.
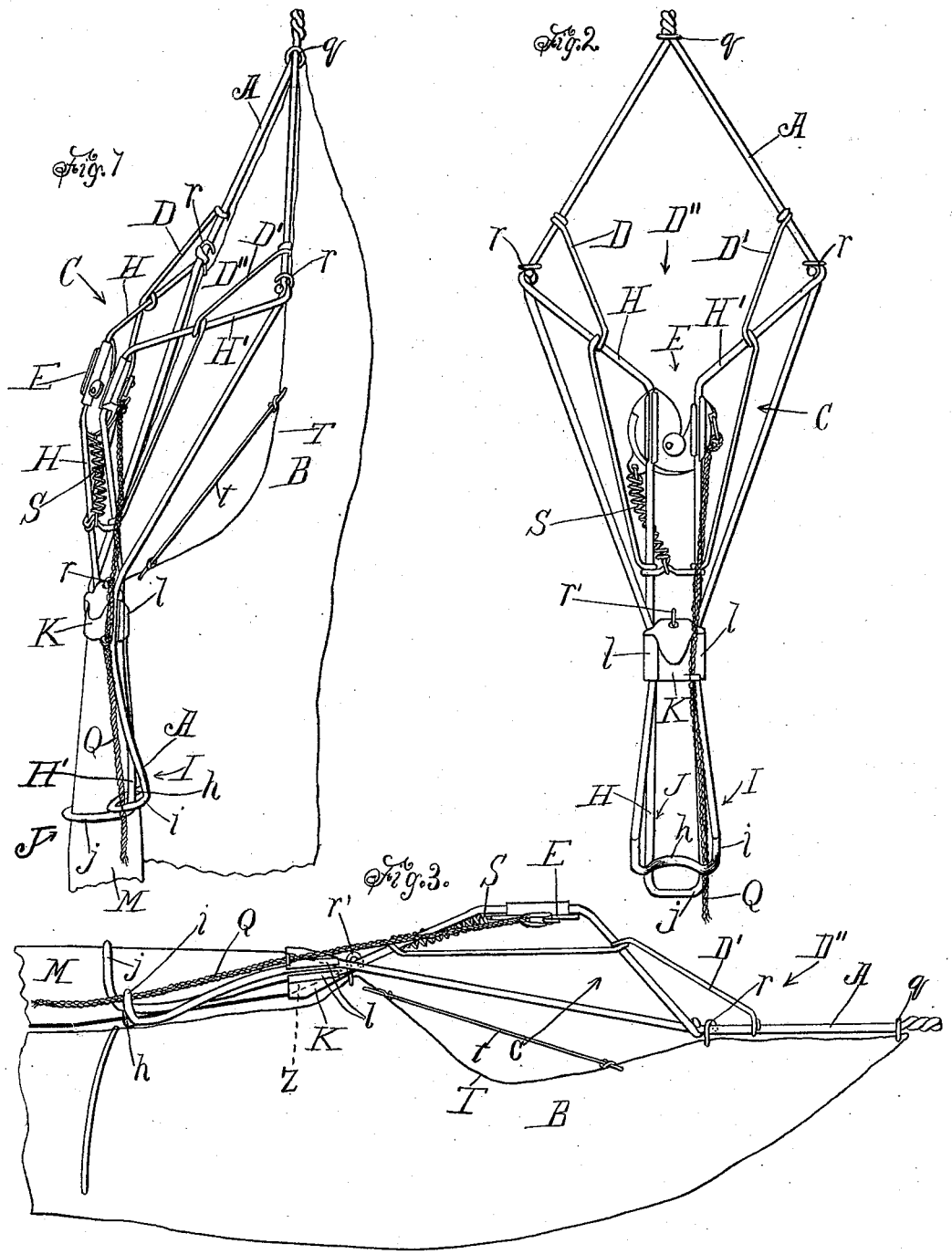
Witnesses.
P. W. Harbeson.
W. F. Somers.
Inventor.
Joshua Swanburg
Hazard & Townsend
his Atty

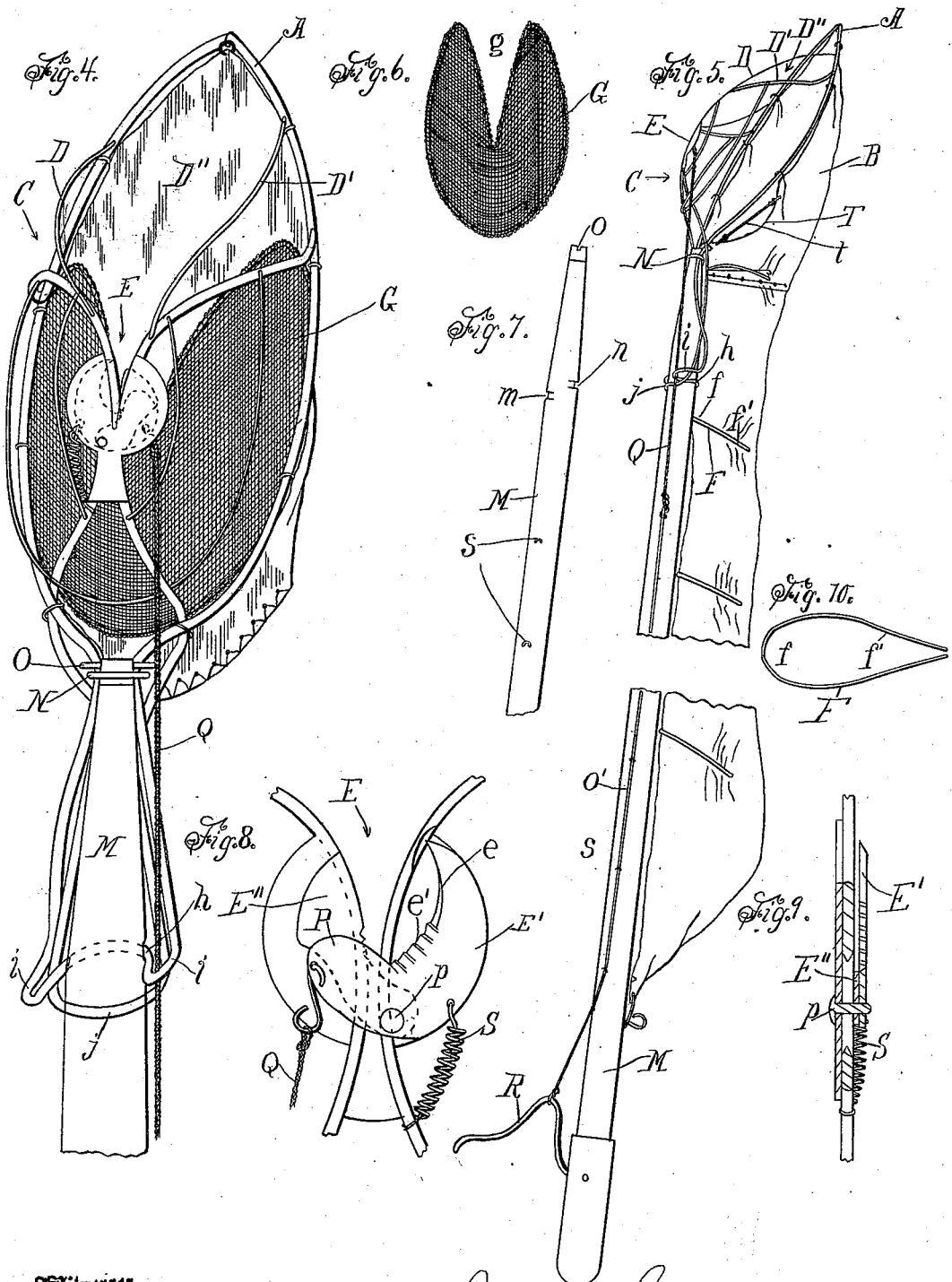

UNITED STATES PATENT OFFICE.

JOSHUA SWANBURG, OF LOS ANGELES, CALIFORNIA.

FRUIT-PICKER.

SPECIFICATION forming part of Letters Patent No. 501,032, dated July 4, 1893.

Application filed April 14, 1892. Serial No. 429,102. (No model.)

*To all whom it may concern:*

Be it known that I, JOSHUA SWANBURG, a citizen of the United States, residing at Los Angeles, in the county of Los Angeles and State of California, have invented a new and useful Improvement in Fruit-Pickers and Detachable Implement Handles, of which the following is a specification.

My invention relates to that class of fruit pickers in which a stem-severing device is arranged at the apex of a suitable V-shaped stem-guide arranged to direct the stems of the fruit into the stem-severing device, and in which a hose is provided to conduct the fruit from the stem-severing device to a suitable receptacle.

My invention pertains specially to the construction, combination and arrangement of parts as hereinafter set forth whereby the convenience and facility with which the fruit may be gathered is increased, at the same time providing against any injury from bruising by reason of too rapid descent through the hose or conduit through which the fruit is lowered, and yet allowing the fruit to descend freely.

A further object is to so construct the device that it can be easily inserted between the limbs of the tree and to provide means whereby the several members of a bunch of fruit can be separated from each other and picked one at a time without disengaging the other members of the bunch.

A further object is to provide suitable means for detachably securing such implement to its handle.

A further object is to so construct and arrange the device that the fruit is not obscured from view by the picker in the operation of detaching the fruit from the limb.

A further object is to provide means whereby the picker may be adapted interchangeably for picking small and large fruits with the greatest facility and convenience in each case.

The accompanying drawings illustrate two forms of fruit picker embodying my invention.

Figure 1 is a side perspective view of the upper portion of a form of picker which I consider specially adapted to secure the greatest strength at the least expense. Fig. 2 is a view of the frame detached from the handle and hose. Fig. 3 is a plain side elevation of the upper end of the picker in a horizontal position. Fig. 4 shows a form of the picker designed to be used for both large and small fruits, a portion of the handle being broken away to contract the view. In this view the main portion of the hose is removed and the upper part of the hose is shown as being laced together at the bottom to form a bag to hold the small fruit as it is gathered. Fig. 5 shows the picker almost intact in position for picking fruit, the small fruit shield being removed to enable the operator to have an unobstructed view of the fruit which it may be desired to pick. Fig. 6 is a view of the small-fruit shield detached. Fig. 7 is a view of the upper part of the handle detached. Fig. 8 is a detail of the under side of the stem-severing device. Fig. 9 is a sectional view showing the pivoted cutting blade and a guard for supporting the same. Fig. 10 is a plain view of one of the retarding springs.

My invention consists in the combination of a dome-shaped wire frame having in its front side an opening to admit the fruit and having its base or rim wire arranged to project in front of such opening and adapted to have the open mouth of the fruit-hose or receiver secured thereto; a stem-severing device arranged at the top of such dome-shaped frame and at the rear point of such fruit-admitting opening, and a fruit hose or receiver having the rim of its open mouth secured to the said base or rim of the frame. The dome shaped frame is made of open wire work and is adapted for attachment to a suitable handle. It consists of a base member or rim A arranged to support and hold open the mouth of the fruit receiver or hose B, and having its front portion converging substantially to a point, and having mounted upon such rim an open wire dome, basket or screen C having two side guide and bunch separating wires D D' forming the sides of the fruit admitting opening D'' and extending from the front portion of the rim or base member backward and upward therefrom and converging toward the stem severing device E. Such stem-severing device E is mounted upon the top of the said basket or frame, and is arranged in combination with suitable means for operating the stem-severing device, a suitable handle, and suitable means for securing the basket or dome-shaped frame to the handle.

My invention also comprises the combination of the handle; the frame secured to such handle; the stem-severing device mounted on such frame; the fruit hose or receiver depending from the frame and arranged along the handle; the ovalescent U spring F having its base *f*, secured to the hose on that side thereof next the handle, and having its free arms *f' f'* bent to bring their ends close to each other and arranged to clasp and compress the walls of the hose at the side farthest from the handle so that the fruit in its descent is directed to pass down the hose near to the handle.

In practice the instrument is ordinarily held inclined more or less toward the side on which is the hose, and the weight of the fruit is thus brought to bear on the side of the hose compressed by the ends of the springs which are free to yield to the pressure and which, while causing sufficient retardation of the fruit to prevent its becoming jammed, do not injure the fruit, and are sufficiently yielding to allow soft fruit to pass through the hose without injury. A series of such springs is provided so that the hose is compressed thereby on the side opposite the handle, (which is the lower side when the picker is in use) into a series of pouches while the side next the handle is practically a uniform tube large enough for such fruit (as figs) which is easily mashed, and which while being retarded by the pouches, will be directed thereby into the unobstructed rear portion of the hose. This form of spring gives great freedom for the passage of either large or small fruit and yet will cause the walls of the hose to sufficiently retard the descent of the fruit to avoid jamming any, even such delicate fruit as figs.

My invention also consists in the combination of the serrated fixed blade E'' and the pivoted cutting knife E' having the point *e* of its blade crescent shaped and the heel *e'* of its cutting edge serrated and having such point and heel and cutting edge arranged in a curve eccentric to the pivot *p* of the knife so that when the pivoted knife is operated to cut the stem of the fruit, there will be an eccentric movement and the curved and serrated edge of the pivoted knife will move in a general direction toward the heel of the fixed blade thus causing the serrations to drag or saw across the stem whereby greater cutting power is secured. By the construction shown I find that large twigs and small limbs are easily severed, thus making the picker efficient for picking fruit in bunches as well as singly.

In the drawings I have shown an oval and a diamond shaped base A' and A. The diamond shape is simpler and stronger than the oval but the oval form gives greater space for the reception of the small-fruit shield G which is provided with a V shaped opening *g* the point or apex of which corresponds to the space between the cutting blades when they are open to receive the stems of the fruit. In practice the shield is not used when large fruit such as figs, pears, apples, oranges, &c., are to be picked as it obstructs the view of the operator and prevents him from seeing how to adjust the instrument to pick the fruit with the greatest convenience. When picking small fruit, however, such as cherries, &c., the shield is inserted to prevent such fruit from falling through the frame.

The main ribs H H' of the basket or dome C and the base or rim A of the frame are made of strong spring wire and are extended downward from the rear of the basket to form in combination with each other, the handle clamp. The extended portions comprise the two spring wire loop shanks I J. One of such shanks J, has at its lower end, the transverse handle embracing loop *j*; and the other shank I, has at its lower end a handle embracing loop *h* formed by a double reverse bend forming side-wire guide loops *i* for the other shank. A ferrule is provided at or near the junction of the shanks and the basket and frame and is arranged to receive the end of the handle, and suitable means are provided to prevent the handle from turning. In Figs. 1 to 3 this ferrule is a casting K having a wedge shaped socket to receive the end of the handle which is made wedge shaped as indicated in dotted lines *z* in Fig. 3. The socket and the wedge shaped portion of the handle are not shown as there is no invention involved in the specific construction indicated. The flat faces of the wedge prevent the handle from turning. The casting is provided at each side with two projecting malleable wings or ears *l l* which are grooved on the inner faces and adapted to clasp upon one of the wire shanks, as I, while the other shank, as H, fits against the outside of the ferrule so as to cause the two shanks to spring to clasp the handle between their transverse loops *h* and *j*. The handle M is provided with suitable transverse side notches *m* and *n* to receive and retain the transverse loops *h* and *j*.

In Figs. 4, 5, and 7 I have shown different means for securing the handle against turning. In this form the ferrule consists simply of a ferrule ring N arranged to embrace the loop-shanks and the handle while a transverse bar O is arranged to extend thereacross to enter the transverse end notch *o* across the end of the handle.

The base or fruit receiver holding rim A, (A') is arranged slightly oblique upward and forward with relation to the handle so that the mouth of the hose or fruit receiver when secured thereto is arranged in a plane slightly below and slightly oblique to and divergent from the extended axis of the handle and the stem-severing device is arranged above such extended axis so that the stem-severing device and the mouth of the hose are on opposite sides of such extended axis of the handle. This affords the greatest convenience of operation as it enables the operator to keep the stem of the fruit in view until the fruit is picked.

The guide and fruit separating wires D D' (and the extension thereof, as formed by H H' in Figs. 1 and 2) are arranged divergent from the stem severing device and extend forward therefrom to the receiver holding rim and serve to guide the fruit into the space between the blades, and they also serve to separate one member of a bunch from the other members thereof, the wire being easily inserted between the members of a bunch of fruit for this purpose.

The mouth of the hose or other receiver is secured to the base or rim A (A') by suitable means, such as the ring q and hooks r, r';—a hole being provided in the ferrule K to receive the hook r'.

The stem-severing device may be operated by any suitable means. In the drawings the pivoted blade E' is provided with the operating arm P to which the string Q is attached and which is connected with the lever R by the wire Q' which is held in place on the handle by the staples s. S is the blade retracting spring.

In order to give unobstructed view of the fruit in cases where the picker has to be held so that the hose or other fruit receiver is between the operator and the fruit, I provide the peep opening T in the hose or receiver B, (which is of canvas) near the lower right hand side of the base member A, and provide a wire t secured to the receiver and arranged across the same to prevent the fruit from falling through.

The general form of the dome-shaped frame may be varied without altering the main principle of my invention with relation thereto which principle consists in elevating the stem-severing device on an open frame work the fruit-receiver securing base or rim of which extends beyond the fruit admitting opening whereby the operator is allowed an unobscured view of the fruit, and whereby the instrument is specially adapted for insertion between limbs and leaves.

Now, having described my invention, what I claim as new, and desire to secure by Letters Patent, is—

1. The combination of the serrated fixed blade E" and the pivoted cutting knife E' having the point e of its blade crescent shape and the heel e' of its cutting edge serrated and having such point and heel and cutting edge arranged in a curve eccentric to the pivot of such knife.

2. The combination set forth of the handle provided with the transverse side notches; the frame; the spring wire loop shank J extending from the frame and having at its end the transverse handle-embracing loop j and the spring wire loop shank I having at its end the handle embracing double reverse bend loop h and forming the side-wire guide loops i for the other shank, and the ferrule arranged to receive the end of the handle.

3. The combination set forth of the handle provided with the transverse side notches and the transverse end notch; the spring wire loop shank J having at its end the transverse handle embracing loop j; the spring wire loop-shank I having at its end the handle embracing double-reverse-bend loop h, and forming the side wire guide loops for the other shank; the ferrule ring arranged to embrace the loop-shanks and the handle, and the transverse bar arranged to extend thereacross to enter the transverse end notch.

4. In a fruit picker the combination of the handle; the dome shaped frame having its base or fruit receiver holding rim arranged oblique upward and forward with relation to the handle, the fruit receiver having its mouth secured to such rim arranged in a plane slightly below and slightly oblique to and divergent from the extended axis of the handle; and the stem severing device mounted on such frame and arranged above such extended axis of the handle.

5. The combination of the dome shaped frame; the stem severing device mounted thereon and the guide and branch separating wires arranged divergent from such stem severing device and extending forward therefrom to the fruit receiver holding rim.

JOSHUA SWANBURG.

Witnesses:
JAMES R. TOWNSEND,
F. M. TOWNSEND.